(12) United States Patent
Lakshmanan et al.

(10) Patent No.: US 10,150,686 B2
(45) Date of Patent: Dec. 11, 2018

(54) REMOVAL OF ARSENIC FROM CONTAMINATED AQUEOUS SOLUTIONS

(71) Applicant: PROCESS RESEARCH MANAGEMENT INC., Mississauga (CA)

(72) Inventors: Vaikuntam I. Lakshmanan, Mississauga (CA); Md. Abdul Halim, Mississauga (CA)

(*) Notice: Subject to any disclaimer, the term of this patent is extended or adjusted under 35 U.S.C. 154(b) by 84 days.

(21) Appl. No.: 15/337,330

(22) Filed: Oct. 28, 2016

(65) Prior Publication Data

US 2017/0144911 A1   May 25, 2017

Related U.S. Application Data

(60) Provisional application No. 62/248,772, filed on Oct. 30, 2015.

(51) Int. Cl.

| | |
|---|---|
| *C02F 9/00* | (2006.01) |
| *C02F 1/26* | (2006.01) |
| *C02F 1/52* | (2006.01) |
| *C02F 1/66* | (2006.01) |
| *C02F 1/28* | (2006.01) |
| *C02F 101/10* | (2006.01) |
| *C02F 103/06* | (2006.01) |
| *C02F 103/00* | (2006.01) |
| *C02F 103/10* | (2006.01) |
| *C02F 103/16* | (2006.01) |

(52) U.S. Cl.
CPC ............ *C02F 9/00* (2013.01); *C02F 1/26* (2013.01); *C02F 1/281* (2013.01); *C02F 1/5245* (2013.01); *C02F 1/66* (2013.01); *C02F 2001/5218* (2013.01); *C02F 2101/103* (2013.01); *C02F 2103/007* (2013.01); *C02F 2103/06* (2013.01); *C02F 2103/10* (2013.01); *C02F 2103/16* (2013.01); *C02F 2209/06* (2013.01)

(58) Field of Classification Search
CPC ........................................................ C02F 9/00
See application file for complete search history.

(56) References Cited

U.S. PATENT DOCUMENTS

| | | | | |
|---|---|---|---|---|
| 5,505,857 A * | 4/1996 | Misra | ............... | C01G 49/009 210/709 |
| 8,366,936 B1 * | 2/2013 | Jones | ............... | C02F 1/288 210/663 |

(Continued)

OTHER PUBLICATIONS

Arum and Chaudhuri, Removal of Arsenic from Ground Water by Iron Oxide-Coated Sand, J. Environmental Engineering, Aug. 1996, 769-771 (Year: 1996).*

*Primary Examiner* — Chester T Barry

(57) ABSTRACT

Processes for the removal of arsenic from aqueous solutions such as contaminated waters and process solutions are disclosed. Arsenic is removed from process solutions/effluents either by precipitation with a soluble iron compound, or solvent extraction and subsequent treatment with engineered materials, such as granular iron oxide. Arsenic may also be directly removed from arsenic contaminated ground and/or surface waters using engineered materials, especially by contacting ground and/or surface waters with silica, granular iron oxide and optionally natural zeolite in sequence. The treated solutions/effluents and waters may be released into the environment.

7 Claims, 3 Drawing Sheets

(56) References Cited

U.S. PATENT DOCUMENTS

2013/0048567 A1* 2/2013 Tongesayi ................ C02F 1/28
210/670
2013/0184149 A1* 7/2013 Auer .................... B01J 20/0211
502/406

* cited by examiner

REMOVAL OF ARSENIC FROM CONTAMINATED AQUEOUS SOLUTIONS

REFERENCE TO RELATED APPLICATION

This application claims priority under 35 USC 119(e) from U.S. Provisional Patent Application No. 62/248,772 filed Oct. 30, 2015.

FIELD OF THE INVENTION

The present invention relates to novel and inventive methods for the removal of arsenic from aqueous solutions containing arsenic, in particular, water contaminated with arsenic, such as, water from process effluents, municipal discharges, surface waters and ground waters that are contaminated with arsenic. In particular, the removal of arsenic is achieved by precipitation with a soluble iron compound, by solvent extraction and subsequent treatment with engineered materials or by direct removal with engineered materials,

BACKGROUND TO THE INVENTION

Arsenic (As) is one of the most hazardous metals present in the environment. It occurs mainly in the form of an arsenite (As(III)) or as an arsenate (As(V)). Arsenic(III) is generally more toxic and more mobile than arsenic(V). Long term exposure to arsenic in drinking water at concentrations significantly above 50 µg/L can cause serious health problems including cancers, melanosis, hyperkeratosis, restrictive lung disease, gangrene, hypertension and peripheral vascular disease. Elevated levels of arsenic in groundwater have been documented in many countries, including in Argentina and Chile in South America, several countries of North and Central America, and India, Bangladesh, Vietnam, Japan and China in Asia.

The WHO (World Health Organization) provisional guideline for the acceptable level of arsenic in drinking water is 10 µg/L. However, many countries, including Bangladesh and China have retained the earlier WHO guideline of 50 µg/L as their standard. In 2001, the Environmental Protection Agency in the U.S. published a new 10 µg/L standard for As in drinking water, requiring public water supplies to reduce As from 50 µg/L to below this limit.

Arsenic is released into the environment by natural activities such as volcanic action, erosion of rocks and forest fires. Thus, water in lakes and rivers can become contaminated with arsenic from natural sources. Arsenic is also released from soils and sediments into groundwater by geogenic processes. In addition, arsenic is present in the environment as a result of industrial activities, including mining and smelting operations, agricultural applications, and the use of industrial products and subsequent disposal of wastes containing arsenic. Due to its toxicity, arsenic has received major attention in the metallurgical industry, especially with respect to processes for the production of value metals such as copper, gold, zinc, cobalt and silver from their ores and concentrates. Despite this attention, there is still a need for processes to lower the concentration of arsenic in process solutions and waters, and especially processes that are friendly to the environment.

Arsenic has been removed from water using nanoscale magnetite, as disclosed by J. W. Farrell et al in Environmental Engineering Science, vol. 31, no. 7, 2014, page 1-10, using a column with a blend of magnetite and sand sandwiched between layers of sand. Reference is made to methods of removal of arsenic from water using a variety of materials, including goethite, hematite, magnetite, zerovalent iron and granular ferric oxide. The removal of arsenic from water with elevated concentrations of silica is disclosed by I. D. Dinkeiman, University of Nevada, Reno in Dissertation & Theses—Gradworks, 2008, reference 1461529 in which arsenic is removed using Kemira™ CFH-12 and CFH-18 as well as Bayoxide™ E33, all of which are stated to be granular ferric oxide. U.S. Pat. No. 7,615,199 of J. Poijarvi et al discloses a two-stage process for removal of arsenic from acidic liquid obtained from sulphuric acid leaching of a value metal from a source material in which solution is treated with a mixture of calcium carbonate and ferrous sulphate in a first stage and then a mixture of ferrous sulphate and calcium hydroxide in a second stage. In Treatment of Copper Smelting and Refining Wastes, Bureau of Mines, US Department of the interior RI 9522, 1994, D. K. Steele et al disclose the use of tributyl phosphate (TBP) in separation of arsenic and molybdenum from acidic copper solutions having a pH of 0-1.

There exists a need in the art for improved processes for the removal of arsenic from aqueous solutions containing arsenic, such as, for example, water contaminated with arsenic.

SUMMARY OF THE INVENTION

It is an object of the present invention to provide novel and inventive processes for the removal of arsenic from aqueous solutions containing arsenic, in particular, water contaminated with arsenic, which processes overcome the deficiencies of the prior art processes.

The present invention relates to novel and inventive methods for the removal of arsenic from aqueous solutions containing arsenic, such as, for example, but not limited to, water contaminated with arsenic, such as, for example, but not limited to, water from process effluents, municipal discharges, surface waters and ground waters that are contaminated with arsenic. The water may be contaminated with naturally occurring arsenic or the arsenic may be in process effluent from a commercial process, e.g., a mineral extraction process. According to methods of the present invention, arsenic is removed from process solutions/effluents either by precipitation with a soluble iron compound such as, for example, but not limited to, ferric chloride, ferric sulphate and combinations thereof, or solvent extraction and subsequent treatment with engineered materials, such as engineered materials comprising granular iron oxide, optionally in combination with silica sand and/or a zeolite, such as, for example, but not limited to, a natural zeolite. Arsenic may also be directly removed from arsenic contaminated water, in one embodiment, naturally arsenic contaminated water, by engineered materials, such as engineered materials comprising granular iron oxide, and, in one embodiment, by treatment with silica and engineered materials comprising granular iron oxide in sequence, optionally followed by treatment with a zeolite, according to methods of the present invention. The treated solutions/effluents and waters may be released into the environment.

The present invention, in one aspect, relates to the removal of arsenic from acidic solutions, in one embodiment, from acidic mixed chloride solutions obtained in a metallurgical process. The arsenic may be in an effluent or other stream in the process. The present invention, in another aspect, relates to the treatment of arsenic-contaminated ground water and/or surface water.

In accordance with another aspect of the present invention, solvent extraction and precipitation with a soluble iron compound such as, for example, but not limited to, ferric chloride, ferric sulphate and combinations thereof, are used to effect removal of arsenic from aqueous solutions, such as process solutions, in one embodiment, acidic solutions, optionally followed by further removal of arsenic using engineered materials, such as engineered materials comprising granular iron oxide, to obtain concentrations of arsenic of <10 µg/L in the final effluents. Another aspect of the present invention is to directly remove arsenic from contaminated water, such as, contaminated surface waters and/or ground waters with engineered materials, such as engineered materials comprising granular oxide, to obtain <10 µg/L of arsenic in the treated waters.

In accordance with another aspect, the present invention provides a process for separation of arsenic from an aqueous solution containing arsenic, the process comprising the steps of:
 a) precipitating arsenic from the aqueous solution with a soluble iron compound at a pH of about 1.5 to about 2.5;
 b) subjecting the resulting solution from a) to a solids/liquids separation step;
 c) optionally recycling all, or a portion of, the separated liquid from step b) to step a); and
 d) discharging the treated effluent.

In an embodiment of the present invention, the soluble iron compound is a soluble iron salt. In another embodiment of the present invention, the soluble iron compound is selected from the group consisting of ferric chloride, ferric sulphate and combinations thereof.

In an embodiment of the present invention, the process further comprises the step of contacting the separated liquid from step b) with engineered materials comprising granular iron oxide to adsorb further arsenic therefrom.

In an embodiment of the present invention, the step of contacting the separated liquid from step b) with engineered materials comprising granular iron oxide comprises contacting the separated liquid from step b) with engineered materials comprising granular iron oxide in combination with silica sand or with engineered materials comprising granular iron oxide in combination with silica sand and a zeolite. In an embodiment of the present invention, the zeolite is a natural zeolite. In an embodiment of the present invention, the natural zeolite is clinoptilolite.

In accordance with another aspect, the present invention provides a process for separation of arsenic from an aqueous solution containing arsenic, the process comprising the steps of:
 a) subjecting the aqueous solution containing arsenic to solvent extraction to form a loaded organic solution containing arsenic and a raffinate and separating the raffinate from the loaded organic solution containing arsenic;
 b) adding aqueous acid solution to the separated loaded organic solution, and stripping to obtain a pregnant strip solution containing arsenic;
 c) precipitating arsenic from the pregnant strip solution with a soluble iron compound at a pH of about 1.5 to about 2.5 and subjecting the resulting pH adjusted solution to a solids/liquids separation step, the liquid so obtained being recycled to step b);
 d) recycling a major part of the raffinate from step a) to a leaching step,
 e) adjusting the pH of a minor part of the raffinate from step a) to a pH in the range of about 6 to about 8 by addition of an alkaline metal oxide and/or an alkaline metal hydroxide, and
 f) contacting the resulting solution from e) with engineered materials comprising granular iron oxide to adsorb arsenic, and
 g) discharging the treated effluent therefrom.

In an embodiment of the present invention, the aqueous solution containing arsenic is an acid mixed chloride solution containing arsenic. In an embodiment of the present invention, the acidic mixed chloride solution is obtained from leaching of a base metal ore or concentrate with acidic mixed chloride lixiviant. In an embodiment of the present invention, the acidic mixed chloride solution is a solution of hydrochloric acid and magnesium chloride.

In an embodiment of the present invention, the solvent extraction is effected with a phosphorus containing extractant. In an embodiment of the present invention, the phosphorous containing extractant is selected from the group consisting of phosphine oxides, alkyl phosphate, alkyl phosphoric acids, alkyl phosphonic acids, alkyl phosphinic acids and combinations thereof. In an embodiment of the present invention, the phosphine oxide is trialkyl phosphine oxide.

In an embodiment of the present invention, the phosphorous containing extractant is mixed with a diluent. In another embodiment of the present invention, the phosphorous containing extractant is mixed with a diluent and a modifier. In an embodiment of the present invention the diluent is an organic phase diluent. In an embodiment of the present invention, the organic phase diluent is an aliphatic hydrocarbon. In an embodiment of the present invention, the modifier is an alkyl phosphate. In an embodiment of the present invention, the alkyl phosphate is tributyl phosphate. In an embodiment of the present invention, the modifier is an alcohol surfactant. In an embodiment of the present invention, the alcohol surfactant is tridecyl alcohol.

In an embodiment of the present invention, the soluble iron compound is a soluble iron salt. In another embodiment of the present invention, the soluble iron compound is selected from the group consisting of ferric chloride, ferric sulphate and combinations thereof.

In an embodiment of the present invention, the alkaline metal oxide is selected from the group consisting of magnesium oxide, calcium oxide and combinations thereof. In another embodiment of the present invention, the alkaline metal oxide is magnesium oxide.

In an embodiment of the present invention, the alkaline metal hydroxide is selected from the group consisting of magnesium hydroxide, calcium hydroxide, potassium hydroxide, sodium hydroxide and combinations thereof. In another embodiment of the present invention, the alkaline metal hydroxide is magnesium hydroxide.

In an embodiment of the present invention, the step of contacting the resulting solution from e) with engineered materials comprising granular iron oxide further comprises contacting the resulting solution with engineered materials comprising granular iron oxide in combination with silica sand or engineered materials comprising granular iron oxide in combination with silica sand and a zeolite to further adsorb arsenic. In an embodiment of the present invention, the zeolite is a natural zeolite. In an embodiment of the present invention, the natural zeolite is clinoptilolite.

In accordance with another aspect, the present invention provides a process for separation of arsenic from an acidic mixed chloride solution containing arsenic, the process comprising the steps of:

a) subjecting the acidic mixed chloride solution containing arsenic to solvent extraction to form a loaded organic solution containing arsenic and a raffinate and separating the raffinate from the loaded organic solution;

b) adding aqueous acid solution to the separated loaded organic solution, and stripping to obtain a pregnant stripped solution containing arsenic;

c) precipitating arsenic from the pregnant stripped solution with a soluble iron compound selected from the group consisting of ferric chloride, ferric sulphate and combinations thereof at a pH of about 1.5 to about 2.5 and subjecting the resulting pH adjusted solution to a solids/liquids separation step, the liquid so obtained being recycled to step b);

d) recycling a major part of the raffinate from step a) to a leaching step, e) adjusting the pH of a minor part of the raffinate from step a) to a pH in the range of about 6 to about 8 by addition of at least one of magnesium oxide, magnesium hydroxide, calcium oxide and calcium hydroxide, f) contacting the resulting pH adjusted raffinate with engineered materials comprising granular iron oxide to adsorb arsenic; and g) discharging the treated effluent therefrom.

In an embodiment of the present invention, the acidic mixed chloride solution is obtained from leaching of a base metal ore or concentrate with an acidic mixed chloride lixiviant. In another embodiment of the present invention, the acidic mixed chloride solution is a solution of hydrochloric acid and magnesium chloride.

In an embodiment of the present invention, the step of contacting the pH adjusted raffinate with engineered materials comprising granular iron oxide further comprises contacting the pH adjusted raffinate with engineered materials comprising granular iron oxide in combination with silica sand or engineered materials comprising granular iron oxide in combination with silica sand and a zeolite to further adsorb arsenic. In an embodiment of the present invention, the zeolite is a natural zeolite. In an embodiment of the present invention, the natural zeolite is clinoptilolite.

In accordance with another aspect, the present invention provides a process for separation of arsenic from an acidic mixed chloride solution containing arsenic, the process comprising the steps of:

a) adjusting the pH of the acidic mixed chloride solution containing arsenic with one or more of magnesium oxide, magnesium hydroxide, calcium oxide and calcium hydroxide to obtain a solution with a pH in the range of about 1.2 to about 2.5;

b) adding a soluble ferric iron compound selected from the group consisting of ferric chloride, ferric sulphate and combinations thereof to the pH-adjusted solution obtained in a) to effect precipitation of an arsenic/iron compound;

c) subjecting the resulting solution from b) to a solids/liquids separation step;

d) adjusting the pH of the separated liquid from step c) to a pH in the range of about 6 to about 8 by addition of at least one of magnesium oxide, magnesium hydroxide, calcium oxide and calcium hydroxide, e) contacting the resulting pH-adjusted solution from d) with engineered materials comprising granular iron oxide to adsorb arsenic; and f) discharging the treated effluent therefrom.

In an embodiment of the present invention, the acidic mixed chloride solution is obtained from leaching of a base metal ore or concentrate with acidic mixed chloride lixiviant. In an embodiment of the present invention, the acidic mixed chloride solution is a solution of hydrochloric acid and magnesium chloride.

In another embodiment of the present invention, the liquid from step c) is separated into a major liquid fraction and a minor liquid fraction, the major fraction of liquid being recycled to one of a leaching step or step a) and the minor fraction being subjected to step d).

In an embodiment of the present invention, the step of contacting the resulting solution from d) with engineered materials comprising granular iron oxide further comprises contacting the resulting solution from d) with engineered materials comprising granular iron oxide in combination with silica sand or engineered materials comprising granular iron oxide in combination with silica sand and a zeolite to further adsorb arsenic. In an embodiment of the present invention, the zeolite is a natural zeolite. In an embodiment of the present invention, the natural zeolite is clinoptilolite.

In accordance with another aspect, the present invention provides a process for removal of arsenic from aqueous solutions containing arsenic, the process comprising the steps of:

a) adjusting the pH of the arsenic contaminated aqueous solutions to a pH in the range of about 6 to about 8 by addition of an alkaline solution if the pH is below about 6 or with an acidic solution if the pH is above about 8, b) contacting the resulting pH-adjusted aqueous solution with engineered materials comprising granular iron oxide to remove arsenic; and c) discharging the treated aqueous solution therefrom.

In an embodiment of the present invention, the aqueous solution containing arsenic is selected from the group consisting of surface waters contaminated with arsenic, ground waters contaminated with arsenic and combinations thereof.

In an embodiment of the present invention, the alkaline solution comprises sodium hydroxide, potassium hydroxide or combinations thereof. In an embodiment of the present invention, the acidic solution comprises hydrochloric acid, sulfuric acid or combinations thereof.

In an embodiment of the present invention, the step of contacting the resulting water pH-adjusted aqueous solution with engineered materials comprising granular iron oxide further comprises contacting the resulting water pH-adjusted aqueous solution with engineered materials comprising granular iron oxide in combination with silica sand or engineered materials comprising granular iron oxide in combination with silica sand and a zeolite to further adsorb arsenic. In an embodiment of the present invention, the zeolite is a natural zeolite. In an embodiment of the present invention, the natural zeolite is clinoptilolite.

BRIEF DESCRIPTION OF THE DRAWINGS

The present invention is illustrated by the embodiments shown in the drawings, in which.

DETAILED DESCRIPTION OF THE INVENTION

Figure 1:
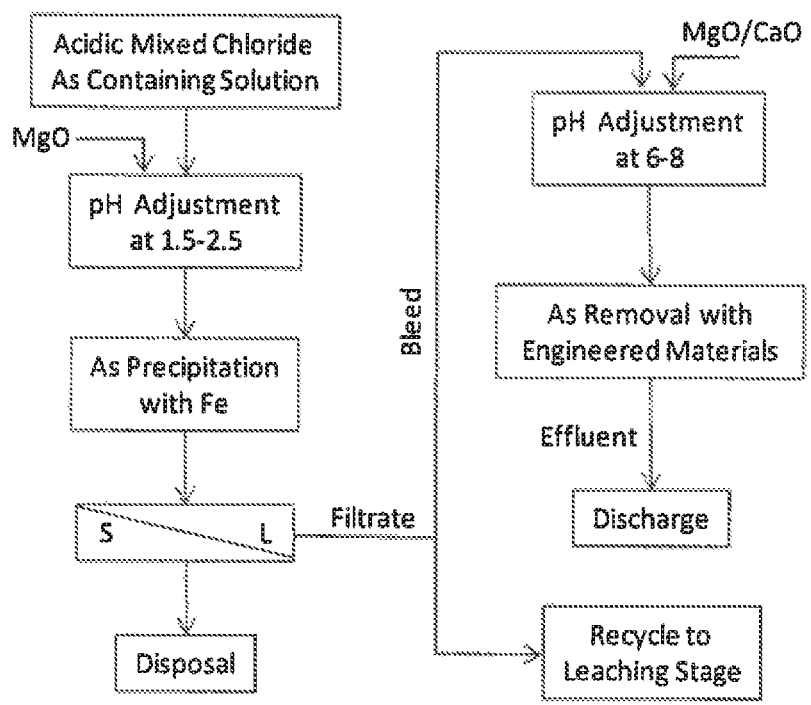
FIG. 1 is a schematic representation of a flow sheet for the removal of arsenic from an acidic mixed chloride solution of base metals in accordance with an embodiment of the present invention.
Figure 2:
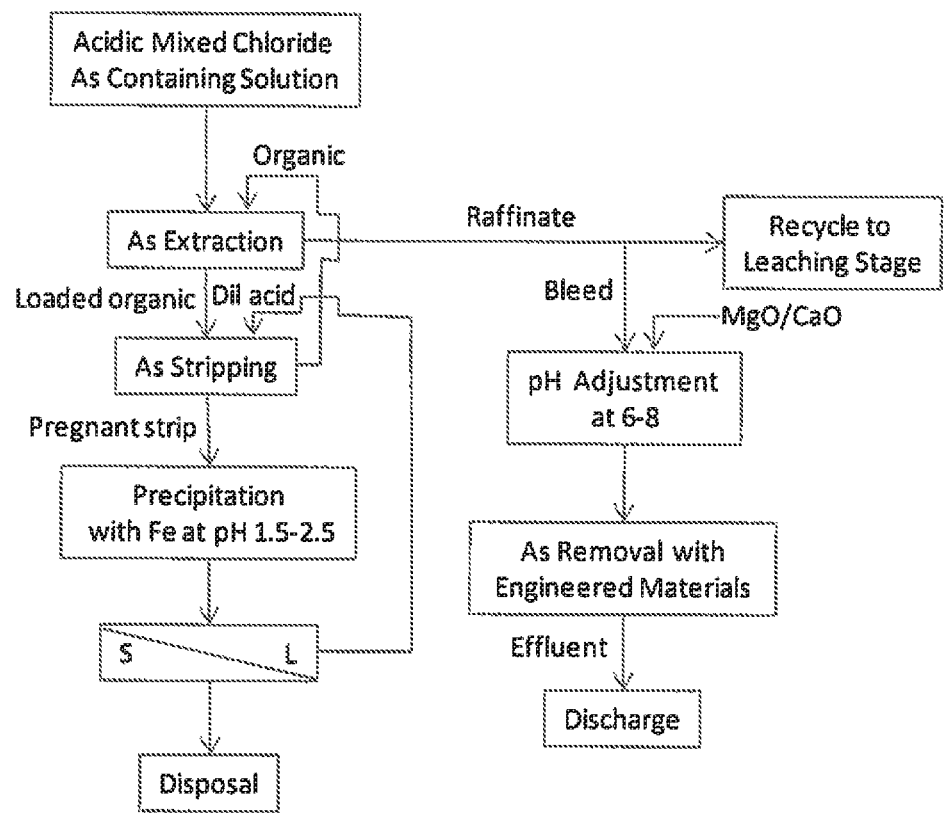
FIG. 2 is a schematic representation of a flow sheet for the removal of arsenic from an acidic mixed chloride solution of precious metals in accordance with an embodiment of the present invention.
Figure 3:
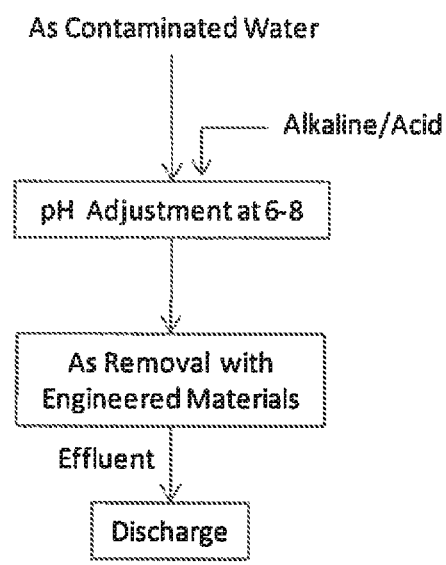
FIG. 3 is a schematic representation of a flow sheet for the removal of arsenic from surface waters and/or ground waters containing arsenic in accordance with an embodiment of the present invention.

The present invention relates to the removal of arsenic from aqueous solutions, such as, for example, but not limited to, process solutions, municipal discharges, surface waters and ground waters that are contaminated with that metal. In particular, the arsenic may be in effluent from a commercial process, e.g., a metallurgical process. Arsenic is present in many ores, soils and sediments in minor amounts. However, arsenic is a very toxic metal and even small amounts of the element are very hazardous. Current acceptable levels of arsenic in water, especially drinking water, are <10 µg/L. Consequently, the amount of arsenic in the effluents from mineral extraction, other processes, and surface waters and ground waters needs to be no higher than this limit.

While arsenic may be present from natural sources, a major source of arsenic is in effluents of processes for the extraction of metals from ores. Such processes include extraction of base metals and precious group metals from their ores. The processes of the present invention described herein, in one aspect, treat acidic mixed chloride solutions. The use of acidic mixed chloride lixiviants is known, for example in extraction of base metals from ores. In particular embodiments of the present invention, these lixiviants are solutions of hydrochloric acid and magnesium chloride, and the extraction of metals using these lixiviants includes, in embodiments of the present invention, recycling of hydrochloric acid/magnesium chloride solutions. In particular embodiments of the present invention, the acidic mixed chloride solutions fed to the processes described herein for removal of arsenic are solutions obtained from such extraction of metals.

In one aspect of the processes of the present invention, the pH of an acidic mixed chloride solution containing arsenic is adjusted with magnesium oxide, or any of its equivalents, such as, for example, but not limited to, magnesium hydroxide, calcium oxide, calcium hydroxide or combinations thereof, to obtain a solution with a pH in the range of about 1.2 to about 2.5. A soluble iron compound such as, for example, but not limited to, ferric chloride, ferric sulphate or combinations thereof, is then added to the solution to effect bulk precipitation of an arsenic/iron compound. The resultant solution containing the precipitate is then subjected to a solids/liquids separation step. The separated solids from the solids/liquids separation step contain a substantial part of the arsenic, and may be subjected to steps to recover arsenic therefrom, and other metals that may be present or disposed of in an environmentally acceptable manner.

The separated liquid from the solids/liquid separation step may be recycled, e.g., recycled as part of lixiviant if that is the origin of the acidic mixed chloride solution. When the acidic mixed chloride solution comprises magnesium, the use of, for example, magnesium oxide or magnesium hydroxide, rather than another alkaline material, maintains the integrity of the lixiviant, and does not introduce extraneous other ions or metals to the leaching system. A minor fraction, which may be referred to as a bleed, is subjected to adjustment of pH to a pH in the range of about 6 to about 8 using, in particular, at least one of magnesium oxide, magnesium hydroxide, calcium oxide and calcium hydroxide. The resultant solution is contacted with engineered materials containing granular iron oxide or with engineered materials comprising granular iron oxide in combination with silica sand or with engineered materials comprising granular iron oxide in combination with silica sand and zeolite. The effluent and solids obtained may be discharged in an appropriate manner.

In an embodiment of the present invention, the acidic mixed chloride solution is obtained from leaching of a base metal ore or concentrate with acidic mixed chloride lixiviant. In an embodiment of the present invention, the acidic mixed chloride solution is a solution of hydrochloric acid and magnesium chloride.

In accordance with another aspect of the present invention, an acidic mixed chloride solution containing arsenic is subjected to solvent extraction to form a loaded organic solution containing arsenic. For instance, an acidic mixed chloride solution is subjected to solvent extraction with a phosphorus containing extractant. In embodiments of the present invention, phosphine oxides, alkyl phosphate, alkyl phosphoric acids, alkyl phosphonic acids, alkyl phosphinic acids and their mixtures are used as extractant. In an embodiment of the present invention, the phosphine oxide is trialkyl phosphine oxide e.g. Cyanex™ 923. In an embodiment of the present invention, the trialkyl phosphine oxide is mixed with a diluent and a modifier. An example of the diluent is an organic phase diluent, for instance, an aliphatic hydrocarbon, e.g., Exxsol™ D80. Examples of the modifier are an alkyl phosphate, e.g., tributyl phosphate and alcohol surfactants, e.g., Exxal™ 13 tridecyl alcohol. The solution obtained is separated into a loaded organic solution and a raffinate. An aqueous acid solution, in one embodiment, a dilute aqueous solution, is added to the loaded organic solution; the aqueous acid solution, in one embodiment of the present invention, is a recycled solution, as described below. The solution thus obtained is then stripped to obtain a pregnant strip solution, which is an aqueous solution containing arsenic and is subjected to further treatment. In an embodiment of the present invention, the organic phase separated in the stripping is recycled to the solvent extraction stage.

The pH of the pregnant strip solution containing arsenic is adjusted with magnesium oxide, or any of its equivalents, such as, for example, but not limited to, magnesium hydroxide, calcium oxide, calcium hydroxide or combinations thereof, to obtain a solution with a pH in the range of about 1.2 to about 2.5. A soluble iron compound such as ferric chloride, ferric sulphate or combinations thereof, is then added to the solution to effect precipitation of an arsenic/iron compound. The resultant solution containing the precipitate is then subjected to a solids/liquids separation step. The solids contain a substantial part of the arsenic in the solution, and maybe subjected to steps to recover arsenic, and other metals that may be present, or disposed of in an environmentally acceptable manner. In an embodiment of the present invention, the liquid from the solids/liquids separation step is recycled to the stripping step.

In the solvent extraction step, a loaded organic solution and a raffinate are obtained. The treatment of the loaded organic solution has been described above. A major fraction of the raffinate is recycled to any leaching step. A minor fraction of the raffinate, which may be referred to as a bleed, is subjected to adjustment of pH to a pH in the range of about 6 to about 8 using, in one embodiment of the present invention, at least one of magnesium oxide, magnesium hydroxide, calcium oxide and calcium hydroxide. The resultant solution is contacted with engineered materials comprising granular iron oxide or with engineered materials comprising granular iron oxide in combination with silica sand or with engineered materials comprising granular iron oxide in combination with silica sand and zeolite. The treated effluent and solids obtained may be discharged in an appropriate manner.

In another embodiment of the present invention, the acidic mixed chloride solution is obtained from leaching of a base metal ore or concentrate with acidic mixed chloride lixiviant. In an embodiment of the present invention, the acidic mixed chloride solution is a solution of hydrochloric acid and magnesium chloride.

The present invention also provides a process for removal of arsenic from a process for the extraction of value metals from an ore, especially a process that uses a lixiviant of hydrochloric acid and magnesium chloride. Other sources of acidic mixed chloride solutions may be used, although, in an embodiment of the present invention, it is preferred that the acid be hydrochloric acid. Acid and solutions containing acid and magnesium chloride may be recycled. Thus, not only does the present invention provide a process for separation of arsenic before discharge of effluents, solutions may be recycled, which is of economic benefit in operation of the process of the present invention. The process of the present invention may be controlled so that the effluents have a level of arsenic of <10 µg/L, thereby meeting current standards for levels of arsenic in many jurisdictions.

Aspects of the process of the present invention that use engineered materials may be used in the treatment of arsenic contaminated water, especially water containing arsenic from natural sources. In particular, treatment may be conducted sequential with silica sand and an iron oxide adsorbent, examples of which are Kemira™ CFH-12 and Bayoxide™ E33 adsorbents. In other embodiments of the present invention, the treatment may be with silica sand, iron oxide adsorbent and a zeolite, especially a naturally occurring zeolite, an example of which is clinoptilolite. The combinations of silica sand and iron oxide adsorbent, in an embodiment, provide improved removal of arsenic compared with iron oxide adsorbent alone. The addition of a zeolite, especially a naturally occurring zeolite, in one embodiment, provides further improvement. An example of the sand is sand that has been sieved to 40×70 mesh particle size. In an embodiment of the present invention, such sieving of sand is an important aspect.

amount of ferric chloride was added to increase the concentration of iron to 4.4 g/L and thereby adjust the iron/arsenic molar ratio in the feed to 2. The concentration of hydrochloric acid in the feed was 1.65 mol/L. Magnesium oxide was added to increase the alkalinity of the solution and thereby induce arsenic precipitation. The test was conducted at room temperature. The slurry obtained after attaining a pH value of 2.5 was subjected to a solid/liquid separation step. The concentrations of arsenic and iron in the filtrate obtained were 3.3 mg/L and 55 mg/L, respectively. Results are summarized in Table 1.

TABLE 1

Arsenic precipitation from a raffinate solution with magnesium oxide in presence of ferric chloride

| Initial As (g/L) | Initial Fe (g/L) | Initial Fe/As (mol/mol) | Initial HCl Concentration (mol/L) | Final pH | Final As (mg/L) | Final Fe (mg/L) |
|---|---|---|---|---|---|---|
| 2.8 | 4.4 | 2 | 1.65 | 2.5 | 3.3 | 55 |

Example 2

This example illustrates removal of arsenic from a magnesium-containing solution using commercial iron oxide based adsorbents. A simulated process solution was prepared by dissolving known amounts of arsenic containing compound (e.g. $Na_2HAsO_4 \cdot 7H_2O$) and $MgCl_2 \cdot 6H_2O$ in water. The concentrations of arsenic and magnesium in the influent were 3.3 mg/L and 20 g/L, respectively. The test was conducted in a small column in a down-flow mode at room temperature. The empty bed contact time (EBCT) was 2 min. Commercially available iron oxide-based adsorbents Kemira™ CFH-12 and Bayoxide™ E22 were used. The adsorbents were crushed and sieved, and a 40×70 mesh particle size was used. Breakthrough occurred after 370 bed volumes for both Kemira™ CFH-12 and Bayoxide™ E33. The concentration of arsenic in the effluent was 7.5 µg/L and 6.9 µg/L before breakthrough had occurred for Kemira™ CFH-12 and Bayoxide™ E33, respectively. The adsorptive capacity until breakthrough at 10 µg/L As was calculated to be 1.02 mg As per 1 g of the adsorbent and 2.44 mg As per 1 g of the adsorbent for Kemira™ CFH-12 and Bayoxide™ E33, respectively. Results are shown in Table 2.

TABLE 2

Arsenic removal from magnesium chloride containing solution with commercial iron oxide-based adsorbents

| Adsorbent | Initial As (mg/L) | Initial pH | EBCT (min) | Bed Volumes Treated | Final As (µg/L) | Adsorptive Capacity (mg As/g Adsorbent) |
|---|---|---|---|---|---|---|
| Kemira™ CFH-12 | 3.3 | 7.0 | 2 | 370 | 8.4 | 1.02 |
| Bayoxide™ E33 | 3.3 | 7.0 | 2 | 370 | 6.9 | 2.44 |

The present invention is illustrated by the following examples.

Example 1

This example illustrates precipitation of arsenic from a raffinate solution using magnesium oxide. A raffinate solution from the solvent extraction of iron was used as feed. The concentration of arsenic in the feed was 2.9 g/L. A known Example 3

This example illustrates removal of arsenic from a magnesium-containing process solution with a combination of silica sand and commercial iron oxide based adsorbents. A simulated process solution was prepared by dissolving known amounts of arsenic containing compound such as $Na_2HAsO_4 \cdot 7H_2O$ and $MgCl_2 \cdot 6H_2O$ in water. The concentrations of arsenic and magnesium in the feed solution were 4.3 mg/L and 19 g/L, respectively. The tests were conducted in a small column in a down-flow mode at room temperature. The adsorption bed consisted of two layers, namely (from the top to the bottom of the column): silica sand and an iron oxide-based adsorbent. The empty bed contact time (EBCT) was 2 min based on the volume of the iron oxide-based adsorbent layer. The commercially available iron oxide-based adsorbents Kemira™ CFH-12 and Bayoxide™ E33 were used. The adsorbents were crushed and sieved. The 40×70 mesh particle size was used. The sand was sieved and the 40×70 mesh particle size was used. Breakthrough occurred after 780 bed volumes and 330 bed volumes of the influent had been treated with Kemira™ CFH-12 and Bayoxide™ E33, respectively. The concentration of arsenic in the effluent was 9.7 µg/L and 6.9 µg/L before breakthrough had occurred with Kemira™ CFH-12 and Bayoxide™ E33, respectively. For comparison with the examples where only iron oxide-based adsorbents were used, the adsorptive capacity of the two-layer bed until breakthrough at 10 µg/L As was based on the mass of the iron oxide-based adsorbent layer and was calculated to be 2.80 mg As per 1 g of the adsorbent and 2.84 mg As per 1 g of the adsorbent for Kemira™ CFH-12 and Bayoxide™ E33, respectively. Results are shown in Table 3.

natural zeolite. A simulated process solution was prepared by dissolving known amounts of $Na_2HAsO_4 \cdot 7H_2O$ and $MgCl_2 \cdot 6H_2O$ in water. The concentrations of arsenic and magnesium in the feed solution were 4.3 mg/L and 19 g/L, respectively. The pH of the feed solution was adjusted to 6.9 with hydrochloric acid. The test was conducted in a small column in a down-flow mode at room temperature. The adsorption bed consisted of three layers, namely (from the top to the bottom of the column): silica sand, an iron oxide-based adsorbent and natural zeolite (clinoptilolite). The volumes of the sand layer and the zeolite layer were six times and three times that of the iron oxide-based adsorbent layer, respectively. The empty bed contact time (EBCT) was 2 min based on the volume of the iron oxide-based adsorbent layer. The commercially available iron oxide-based adsorbent Kemira™ CFH-12 was used. The adsorbent was crushed and sieved. The 40×70 mesh particle size was used. The sand and zeolite were sieved and the 40×70 mesh particle size was used. Breakthrough occurred after 1620

TABLE 3

Arsenic removal from a magnesium-containing solution with a combination of silica sand and commercial iron oxide-based adsorbents

| Adsorbent* | Initial As (mg/L) | Initial pH | EBCT** (min) | Bed Volumes Treated | Final As (µg/L) | Adsorptive Capacity*** (mg As/g Adsorbent) |
|---|---|---|---|---|---|---|
| kemira ™ CFH-12 | 4.3 | 6.9 | 2 | 780 | 9.7 | 2.80 |
| Bayoxide ™ E33 | 4.3 | 6.9 | 2 | 330 | 6.9 | 2.84 |

*The adsorbent bed consisted of silica sand in addition to a commercial iron-oxide based adsorbent
**The empty bed contact time (EBCT) is based on the volume of the iron oxide-based adsorbent layer
***The adsorptive capacity is based on the mass of the iron oxide-based adsorbent layer bed volumes of the influent had been treated. The concentration of arsenic in the effluent was 6.9 µg/L before breakthrough had occurred. Results are shown in Table 4.

TABLE 4

Arsenic removal from magnesium-containing solution with a combination of silica sand, a commercial iron oxide-based adsorbent and natural zeolite

| Adsorbent* | Initial As (mg/L) | Initial pH | EBCT** (min) | Bed Volumes Treated | Final As (µg/L) | Adsorptive Capacity*** (mg As/g Adsorbent) |
|---|---|---|---|---|---|---|
| Kemira ™ CFH-12 | 4.3 | 6.9 | 2 | 1620 | 6.9 | 5.81 |

*The adsorbent bed consisted of sand, a commercial iron-oxide based adsorbent and zeolite
**The empty bed contact time (EBCT) is based on the volume of the iron oxide-based adsorbent layer
***The adsorptive capacity is based on the mass of the iron oxide-based adsorbent layer It can be seen that the addition of sand to Kemira™ CFH-12 has more effect compared to the addition with Bayoxide™ E33 for the removal of arsenic from magnesium-containing process solution.

Example 4

This example illustrates arsenic removal from a magnesium-containing process solution with a combination of silica sand, a commercial iron oxide-based adsorbent and For comparison with the examples where only the iron oxide-based adsorbent was used, the adsorptive capacity of the three-layer bed until breakthrough at 10 µg/L As was based on the mass of the iron oxide-based adsorbent layer and was calculated to be 5.81 mg As per 1 g of the adsorbent. The removal capacity for arsenic has increased from 2.8 mg As per 1 g of the adsorbent to 5.81 mg As per 1 g of the adsorbent by adding zeolite to silica sand and Kemira™ CFH-12.

Example 5

This example illustrates solvent extraction of arsenic. A four stage extraction of arsenic was carried out by contacting iron raffinate aqueous solution containing about 1.4 N HCl with an organic solution consisting of about 30% of Cyanex™ 923 and 30% of tributylphosphate (TBP) in Exxsol™ D80 at the O/A ratio of 1 at ambient temperature. The results are shown in Table 5.

TABLE 5

A four stage arsenic extraction from iron raffinate with an organic phase containing 30% of Cyanex™ 923, 30% of TBP in Exxsol™ D80 at the O/A ratio of 1

| | Concentration of As (mg/L) | |
|---|---|---|
| | Aqueous phase | Organic phase |
| Feed: Iron raffinate | 3147 | 0 |
| Arsenic raffinate | 82.8 | 3064.2 |

The loading of As into the organic phase was 3064.2 mg/L. Extraction of As from Fe raffinate was also carried out at different O/A ratios. Results are summarized in Table 6.

TABLE 6

Extraction of arsenic from iron raffinate with an organic phase containing 30% of Cyanex™ 923, 30% of TBP in Exxsol™ D80 at different O/A ratios

| | Concentration of As (mg/L) | |
|---|---|---|
| O/A ratio | Aqueous Phase | Organic Phase |
| | 3295 | 0 |
| 10:1 | 155 | 314 |
| 5:1 | 298 | 599 |
| 2:1 | 731 | 1282 |
| 1:1 | 1204 | 2091 |
| 1:2 | 2144 | 2302 |
| 1:5 | 2877 | 2090 |
| 1:10 | 3099 | 1960 |

Example 6

Stripping of As was performed by contacting an aqueous solution containing about 0.05 N HCl with an arsenic-loaded organic phase at different CNA ratios at ambient temperature. Results are shown in Table 7.

TABLE 7

Stripping of As from the loaded organic phase with an aqueous phase containing 0.05N HCl at different O/A ratios at ambient temperature

| | Concentration of As (mg/L) | |
|---|---|---|
| O/A ratio | Aqueous phase | Organic phase |
| | 0 | 2035 |
| 5:1 | 1755 | 1684 |
| 1:1 | 1153 | 882 |
| 1:3 | 621 | 174 |
| 1:5 | 403 | 20 |

More than 99% of As was stripped from the loaded organic phase at the O/A ratio of 1:5 and pregnant strip solution contains 1755 mg/L of arsenic at the O/A ratio of 5:1. Arsenic can be removed from this solution by bulk precipitation with iron(III) salts such as ferric chloride, ferric sulphate or combinations thereof, followed by adsorption with engineered materials comprising iron compound mixed with silica to obtain <10 µg/L of As in the final process solution.

Example 7

Extraction of arsenic and iron was carried out by contacting a raffinate aqueous solution containing 3168 mg/L of iron and about 1.4 N HCl with an organic solution consisting of about 30% of Cyanex™ 923 and 30% of tributylphosphate (TBP) in Exxsol™ 080 at the O/A ratio of 1:2 at ambient temperature. Subsequently, a three stage stripping of arsenic and iron was performed by conducting the loaded organic phase with an aqueous phase containing 0.05 N HCl at the O/A ratio of 1:3. Results are summarized in Table 8.

TABLE 8

Extraction of arsenic from partially extracted iron raffinate followed by striping of arsenic from loaded organic with 0.05N HCl

| | Concentrations of As (mg/L) | | Concentration of Fe (mg/L) | |
|---|---|---|---|---|
| | Aqueous Phase | Organic Phase | Aqueous Phase | Organic Phase |
| Feed | 3148 | 0 | 3168 | 0 |
| Raffinate and loaded organic | 2247 | 1802 | 14.8 | 6306.4 |
| Loaded Organic | 0 | 1802 | 0 | 6306 |
| Pregnant strip and barren organic | 1735.5 | 66.5 | 5497.2 | 808.8 |

1735.5 mg/L and 5497.2 mg/L of total arsenic and iron are found in the pregnant strip solution, respectively. Arsenic and iron can be removed from this solution by bulk precipitation followed by adsorption of arsenic with engineered materials containing granular iron oxide or with engineered materials containing granular iron oxide in combination with silica sand or with engineered materials containing granular iron oxide in combination with silica sand and zeolite.

Example 8

This example illustrates the removal of arsenic from contaminated ground waters and surface waters using iron oxide based commercial adsorbents. A simulated arsenic contaminated water was prepared by dissolving a known amount of $Na_2HSO_4 \cdot 7H_2O$ in tap water. The concentration of arsenic in this water was 5 mg/L. The pH of the water was 7.5 and was not adjusted. The test was conducted in a small column in a down-flow mode at room temperature. The empty bed contact time (EBCT) was 2 min. Commercially available adsorbents Kemira™ CFH-12 and Bayoxide™ E33 were used. The adsorbents were crushed and sieved to a 40×70 mesh particle size. Breakthrough occurred after 470 bed volumes and 240 bed volumes had been treated with Kemira™ CFH-12 and Bayoxide™ E33, respectively. The concentration of arsenic in the effluent was 7.2 µg/L and 8 µg/L before breakthrough had occurred with Kemira™ CFH-12 and Bayoxider™ E33, respectively. The adsorptive capacity until breakthrough at 10 µg/L As was calculated to be 1.96 mg As per 1 g of the adsorbent and 2.4 mg As per 1 g of the adsorbent for Kemira™ CFH-12 and Bayoxide™ E33, respectively. Results are shown in Table 9.

TABLE 9

Arsenic removal from contaminated water with commercial adsorbents

| Adsorbent | Initial As (mg/L) | Initial pH | EBCT (min) | Bed Volumes Treated | Final As (µg/L) | Adsorptive Capacity (mg As/g Adsorbent) |
|---|---|---|---|---|---|---|
| Kemira ™ CFH-12 | 5 | 7.5 | 2 | 470 | 7.2 | 1.96 |
| Bayoxide ™ E33 | 5 | 7.5 | 2 | 240 | 8.0 | 2.40 |

It can be seen that the removal capacity of Bayoxide™ E33 for arsenic is higher than that of Kemira™ CFH-12.

Example 9

This example illustrates arsenic removal from contaminated water with a combination of silica sand and commercial iron oxide-based adsorbents. A simulated arsenic contaminated water was prepared by dissolving a known amount of $Na_2HAsO_4.7H_2O$ in tap water. The concentration of arsenic in the feed water was 5 mg/L. The pH of the influent was 7.5 and was not adjusted. The tests were conducted in a small column in a down-flow mode at roam temperature. The adsorption bed consisted of two layers, namely (from the top to the bottom of the column): silica sand and an iron oxide-based adsorbent. The empty bed contact time (EBCT) was 2 min based on the volume of the iron oxide-based adsorbent layer. The iron oxide-based adsorbents Kemira™ CFH-12 and Bayoxide™ E33 were crushed and sieved and the 40×70 mesh particle size was used. The sand was sieved and the 40×70 mesh particle size was used. Breakthrough occurred after 540 bed volumes and 630 bed volumes of the influent had been treated with Kemira™ CFH-12 and Bayoxide™ E33, respectively. Results are shown in Table 10.

TABLE 10

Arsenic removal from contaminated water with a combination of silica sand and commercial iron oxide-based adsorbents

| Adsorbent* | Initial As (mg/L) | Initial pH | EBCT** (min) | Bed Volumes Treated | Final As (µg/L) | Adsorptive Capacity*** (mg As/g Adsorbent) |
|---|---|---|---|---|---|---|
| Kemira ™ CFH-12 | 5 | 7.5 | 2 | 540 | 5.1 | 2.26 |
| Bayoxide ™ E33 | 5 | 7.5 | 2 | 630 | 5.7 | 6.30 |

*The adsorbent bed consisted of silica sand in addition to a commercial iron-oxide based adsorbent
**The empty bed contact time (EBCT) is based on the volume of the iron oxide-based adsorbent layer
***The adsorptive capacity is based on the mass of the iron oxide-based adsorbent layer The concentration of arsenic in the effluent was 5.1 µg/L and 5.7 µg/L before breakthrough had occurred with Kemira™ CFH-12 and Bayoxide™ E33, respectively. For comparison with the examples where only iron oxide-based adsorbents were used, the adsorptive capacity of the two-layer bed until breakthrough at 10 µg/L As was based on the mass of the iron oxide-based adsorbent layer and was calculated to be 2.25 mg As per 1 g of the adsorbent and 6.30 mg As per 1 g of the adsorbent for Kemira™ CFH-12 and Bayoxide™ E33, respectively. It can be seen that the addition of sand to Bayoxide™ E33 has high effect compared to the addition with Kemira™ CFH-12 for the removal of arsenic from magnesium-containing process solutions.

SUMMARY OF DISCLOSURE

In Summary of this disclosure, the present invention is directed to processes for the removal of arsenic from aqueous solutions. Numerous modifications are possible within the scope of the present invention and the scope of the claims should not be limited by the preferred embodiments set forth in the examples, but should be given the broadest interpretation consistent with the description as a whole.

The invention claimed is:

1. A process for separation of arsenic from an aqueous solution containing arsenic, the process comprising the steps of:
    a) subjecting the aqueous solution containing arsenic to solvent extraction to form a loaded organic solution containing arsenic and a raffinate and separating the raffinate and the loaded organic solution;
    b) adding aqueous acid solution to the loaded organic solution so obtained, and stripping to obtain a pregnant strip aqueous solution containing arsenic;
    c) precipitating arsenic with a soluble iron compound at a pH of about 1.5 to about 2.5 and subjecting the resulting pH-adjusted solution to a solids/liquids separation step, the liquid so obtained being recycled to step b);
    d) recycling a major part of raffinate from step a) to a leaching step;
    e) adjusting the pH of a minor part of the raffinate from step a) to a pH in the range of about 6 to about 8 by addition of at least one of magnesium oxide, magnesium hydroxide, calcium oxide and calcium hydroxide, contacting the resulting solution with engineered materials comprising granular iron oxide or engineered materials comprising granular iron oxide in combination with silica sand or engineered materials comprising granular iron oxide in combination with silica sand and zeolite to adsorb arsenic; and
    f) discharging the treated effluent therefrom.

2. The process of claim 1 in which the aqueous solution containing arsenic is obtained from leaching of a base metal ore or concentrate with an acidic mixed chloride solution.

3. The process of claim 2 in which the acidic mixed chloride solution is a solution of hydrochloric acid and magnesium chloride.

4. A process for separation of arsenic from an acidic mixed chloride solution containing arsenic, the process comprising the steps of:

a) adjusting the pH of the acidic mixed chloride solution containing arsenic using magnesium oxide or magnesium hydroxide to obtain a pH-adjusted solution with a pH in the range of about 1.2 to about 2.5;

b) adding a soluble ferric iron compound selected from the group consisting of ferric chloride, ferric sulphate and combinations thereof to effect precipitation of an arsenic/iron compound;

c) subjecting the resulting solution from b) to a solids/liquids separation step;

d) adjusting the pH of the separated liquid from step c) to a pH in the range of about 6 to about 8 by addition of at least one of magnesium oxide, magnesium hydroxide, calcium oxide and calcium hydroxide, e) contacting the resulting pH-adjusted solution from d) with engineered materials comprising granular iron oxide or with engineered materials comprising granular iron oxide in combination with silica sand or with engineered materials comprising granular iron oxide in combination with silica sand and zeolite to adsorb arsenic; and f) discharging the treated effluent therefrom.

5. The process of claim 4 in which the acidic mixed chloride solution is obtained from leaching of a base metal ore or concentrate with acidic mixed chloride lixiviant.

6. The process of claim 5, wherein the acidic mixed chloride solution is a solution of hydrochloric acid and magnesium chloride.

7. The process of claim 5 in which the liquid from step c) is separated into a major liquid fraction and a minor liquid fraction, the major fraction of liquid being recycled to one of a leaching step or step a) and the minor fraction being subjected to step d).

* * * * *